United States Patent [19]

Ewasko et al.

[11] Patent Number: 5,784,772
[45] Date of Patent: Jul. 28, 1998

[54] METHOD OF SIMULTANEOUSLY FORMING MR SENSORS IN A DUAL ELEMENT MR HEAD

[75] Inventors: Diane C. Ewasko, Boulder; James C. Cates, Louisville; Richard W. Crowell, Broomfield; Richard H. Dee, Louisville, all of Colo.

[73] Assignee: Storage Technology Corporation, Louisville, Colo.

[21] Appl. No.: 576,814

[22] Filed: Dec. 21, 1995

[51] Int. Cl.$^6$ .................. G11B 5/127; G11B 5/39
[52] U.S. Cl. .................. 29/603.15; 29/603.14; 29/603.18; 216/22; 360/113
[58] Field of Search ............... 29/603.13, 603.14, 29/603.15, 603.16, 603.18, 603.19, 603.25; 216/22; 360/43

[56] References Cited

U.S. PATENT DOCUMENTS

| | | | |
|---|---|---|---|
| 4,835,510 | 5/1989 | Shibasaki et al. | 338/32 |
| 5,018,037 | 5/1991 | Krounbi et al. | 360/113 |
| 5,141,623 | 8/1992 | Cohen et al. | 29/603.18 X |
| 5,270,892 | 12/1993 | Naberhuis | 360/113 |
| 5,296,987 | 3/1994 | Anthony et al. | 360/113 |
| 5,371,643 | 12/1994 | Yuito et al. | 29/603.18 X |
| 5,434,733 | 7/1995 | Hesterman et al. | 360/113 |
| 5,435,053 | 7/1995 | Krounbi et al. | 29/603.25 |
| 5,438,747 | 8/1995 | Krounbi et al. | 29/603.16 |

*Primary Examiner*—Peter Vo
*Attorney, Agent, or Firm*—Sheridan Ross P.C.

[57] ABSTRACT

The present invention discloses an improved structure and method of forming a dual magnetoresistive element head. The dual magnetoresistive element head includes a first and a second magnetoresistive element and leads extending from opposite end segments of each magnetoresistive element. In one aspect of the present invention, the first and second magnetoresistive elements and the leads are simultaneously formed from a wafer comprising a first and a second magnetic layer separated by an intermediate gap layer.

14 Claims, 7 Drawing Sheets

METHOD OF SIMULTANEOUSLY FORMING MR SENSORS IN A DUAL ELEMENT MR HEAD

FIELD OF THE INVENTION

The present invention generally relates to the field of magnetic read/write heads and, more particularly, to a dual element magnetoresistive head.

BACKGROUND OF THE INVENTION

An active area of development for magnetic read/write heads is dual sensor element thin film read heads using magnetoresistive (MR) technology. In such heads, MR conductive thin films are formed into parallel MR elements on a substrate and arranged close together to provide a narrow region in which magnetic fields are sensed. The MR elements are used to sense magnetically encoded information on a magnetic media. In operation, a sense current is passed through each MR element. The presence of a magnetic field changes the resistance of the MR elements. The change in voltage drop across the MR elements due to the change of resistance is measured and used to recover magnetically stored information. The output of the two MR elements is differentially sensed to provide common mode rejection.

Dual MR element heads require two sets of conducting leads, one set per MR element, to conduct the sense current through each MR element. The segment of each MR element between the leads forms an active MR region for sensing magnetic fields. The performance of the dual MR element head depends upon making the active MR region in each MR element substantially identical and aligned.

Prior art approaches to providing a dual MR element head have used a series of deposition and etching processes to separately form each MR element and the leads. These approaches have inevitably resulted in some amount of alignment error between the active MR regions of the MR elements resulting in an associated decrease in head performance. Improvements in the prior art approaches have been directed to improving the alignment between the separately formed structures for the dual MR element head.

SUMMARY OF THE INVENTION

The present invention provides improvements in the structure for and method of making a dual MR element head. The dual MR element head comprises a first and a second MR element and a pair of leads extending from opposite end segments of each MR element. One pair of leads, a first and a second lead, extend from opposite end segments of the first MR element for conducting current through an active MR region between the leads of the first MR element. Likewise, another pair of leads, a third and a fourth lead, extend from opposite end segments of the second MR element for conducting current through an active MR region between the leads of the second MR element.

According to one aspect of the present invention, the first MR sensor region along with the first and second leads and the second MR sensor region along with the third and fourth leads are simultaneously formed from a wafer comprising a first and a second magnetic layer separated by an intermediate gap layer. The intermediate gap layer provides electrical and magnetic isolation between the two magnetic layers. Advantageously, the performance of the dual MR element head is improved by the active MR regions of each element being formed substantially aligned. In particular, the end segments of the first and second elements from which the leads extend are made substantially aligned, thereby aligning the active MR regions provided between the leads. Furthermore, the length and width of the first and second MR elements can be made substantially the same.

According to one embodiment of the present invention, the wafer is formed by depositing a first magnetic layer on top of a bottom gap layer, depositing an intermediate gap layer on top of the first magnetic layer, and then depositing a second magnetic layer on top of the intermediate gap layer. The MR sensors and associated leads are then simultaneously formed by selectively removing the first and second magnetic layers of the wafer.

According to another embodiment of the present invention, an improved structure and method is provided for forming a coupled MR element head in which a lead from each of the first and second elements is electrically coupled together. In particular, a lead extending from the second MR sensor is formed to overlie a lead extending from the first MR sensor. The top of the lead extending from the first MR sensor is then exposed by removing a segment of each of the second magnetic layer and the intermediate gap layer. A conductive layer is then formed on top of the two leads and extending therebetween to electrically couple the two leads. Advantageously, the two leads can be electrically coupled close to the active MR region to lower the electrical resistance of the leads and, thereby, improve the sensitivity of the MR elements.

According to another embodiment of the present invention, a structure and method is provided for electrically isolating adjacent non-coupled leads in each of the first and second elements. In particular, a void is formed in the first magnetic layer of the wafer and a lead for the second MR element is formed in the second magnetic layer of the wafer to overlie the formed void. In this manner, improved electrical isolation is provided between the lead formed in the second magnetic layer of the wafer and an adjacent lead formed in the first magnetic layer of the wafer.

Simultaneously forming the first and second MR elements can create a sharp step transition between the top edges of the second MR element and the substrate. If a top gap layer were formed across the top of the second MR element according to prior art methods, the thickness of the top gap layer may be reduced along the top edges of the second MR element which can cause electrical shorting between the second MR element and a top shield layer formed thereon. According to further embodiments of the present invention, an improved structure and method is provided for forming the top gap layer with an additional gap layer of a predetermined thickness along the top edges of the second MR element. Furthermore, the thickness of the additional gap layer along the top edges can be substantially independent of the height of the transition, thereby providing improved electrical isolation between the second MR element and a top shield layer.

In an alternate embodiment, the top gap layer provides a planarized layer upon which the top shield layer is formed, thereby providing a planarized top shield layer.

In this manner, the present invention provides an improved structure and method of making a dual MR element head.

BRIEF DESCRIPTION OF THE DRAWINGS

For a more complete understanding of the present invention and further advantages thereof, reference is now made to the following Detailed Description, taken in conjunction with the Drawings, in which.

DETAILED DESCRIPTION OF THE INVENTION

Figure 1:
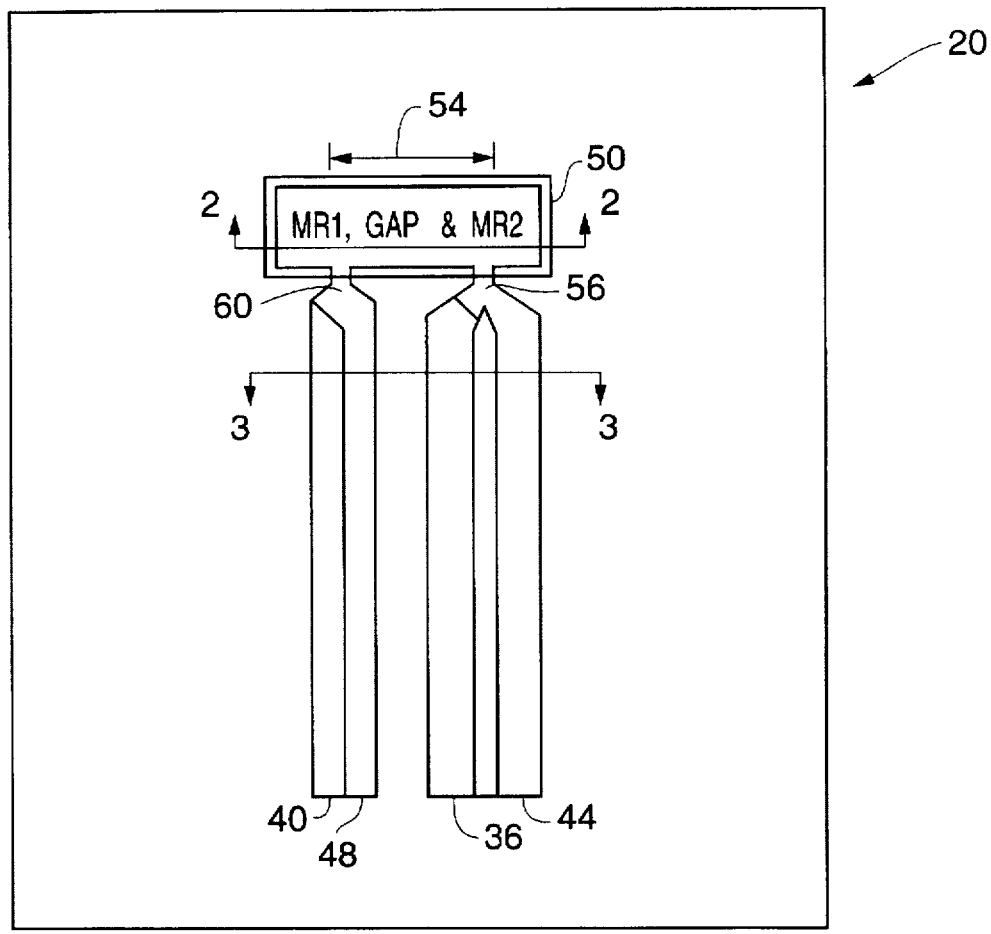
FIG. 1 is a top plan view of a dual MR element head according to the present invention.
Figure 2:
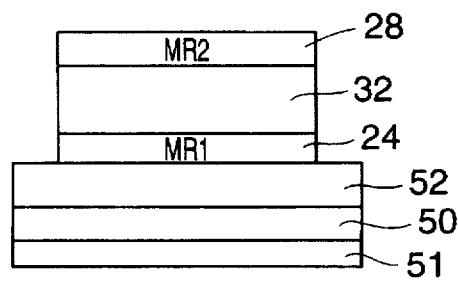
FIG. 2 is a sectional view of the dual MR elements taken along line 2—2 in FIG. 1.
Figure 3:
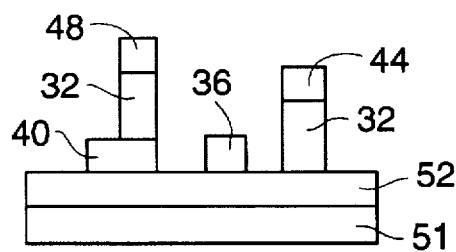
FIG. 3 is a sectional view of the leads taken along line 3—3 in FIG. 1.

FIGS. 1–3 illustrate a dual element MR head 20 and FIGS. 4–15 illustrate the inventive steps for manufacturing the dual element MR head according to the present invention. Referring to FIGS. 1–3 of which FIG. 1 is a top plan view of the dual element MR head 20 and FIGS. 2–3 are sectional views taken along lines 2—2 and 3—3, respectively, in FIG. 1. The dual element MR head 20 comprises a first MR element 24 and a second MR element 28 separated by an intermediate gap layer 32. The head 20 further comprises a first and a second lead 36, 40 that extend from opposite end segments of the first MR element 24 and a third and a fourth lead 44 and 48 that extend from opposite end segments of the second MR element 28. The leads 36, 40, 44, and 48 conduct current through an active MR region 54 of the MR elements 24 and 28.

The MR elements 24 and 28 are formed on top of a bottom shield layer 50 and electrically isolated from the bottom shield layer by a bottom gap layer 52. As will be described in detail later, an additional gap layer, a top gap layer, and a top shield layer are formed on top of the MR elements and leads. The leads are formed on top of the bottom gap layer 52. The bottom gap layer is formed on a substrate 51.

The illustrated structure of the dual MR element head 20 provides several advantages over known heads. In particular, the active MR regions 54 of the MR elements 24 and 28 are made substantially aligned with the length and width of the MR elements substantially the same. Furthermore, the structure of the leads 40 and 48 is advantageous for electrically coupling the leads 40 and 48 to provide a common lead for the coupled MR element head. As will be discussed in more detail below, the leads 40 and 48 can be electrically coupled by forming a conductive wiring layer over the top of leads 40 and 48 and extending therebetween. In addition, the illustrated structure of lead 44 separated from the bottom gap layer 52 by the intermediate gap layer 32 is advantageous for providing improved electrical isolation between lead 44 and 36 near the sensor regions. Further advantages of the illustrated dual MR element head 20 will be appreciated by one skilled in the art from the following description of the method for manufacturing the head 20 according to the present invention.

Figure 4:
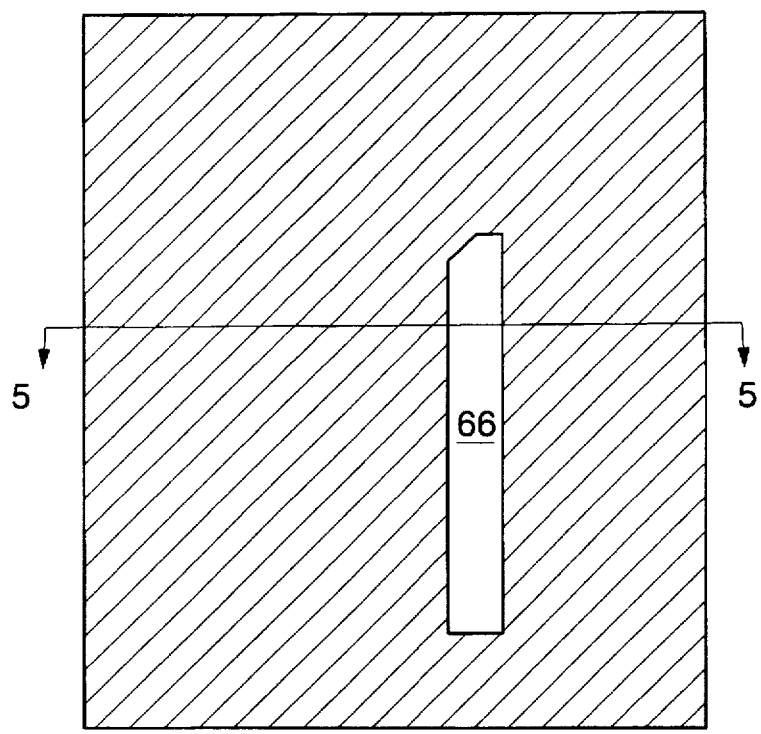
FIG. 4 is a top plan view of the wafer with a segment of the first magnetic layer removed.
Figure 5:
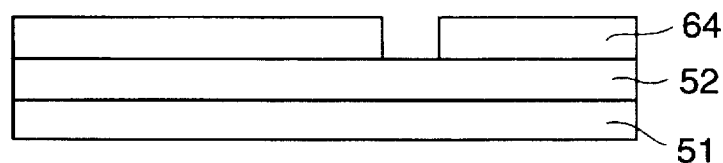
FIG. 5 is a sectional view taken along line 5—5 in FIG. 4.
Figure 6:
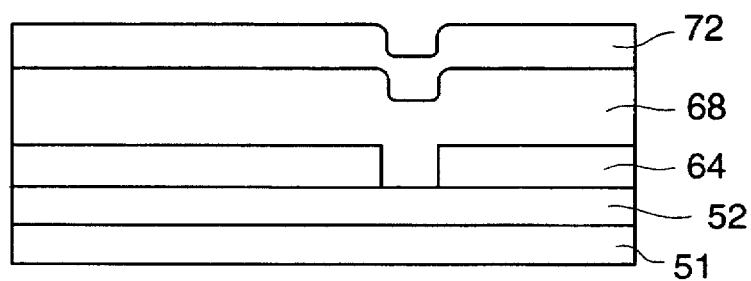
FIG. 6 is a sectional view taken along line 5—5 in FIG. 4 further illustrating the two MR layers and intermediate gap layer.

Each of FIGS. 4–15 illustrate the dual MR element head 20 in the course of manufacturing steps. FIGS. 4–5 illustrate a wafer comprising the bottom gap layer 52 deposited on top of the bottom shield 50 and the substrate 51, and with a first MR layer 64 deposited thereon. The bottom shield 50 generally comprises a magnetic material that is deposited by electroplating or sputtering. The bottom gap layer 52 comprises an electrically insulative material that is deposited by a technique such as chemical vapor deposition or sputtering. The first MR layer 64 is deposited on top of the bottom gap layer 52 using a technique such as sputtering. The first MR layer 64 can comprise a magnetic material having a magnetoresistive effect such as Ni-Fe alloys, Ni-Co alloys and other ferromagnetic material. A segment 66 of the first MR layer 64 is removed such as by an ion milling technique utilizing a photoresist mask. Preferably, the size of the removed segment 66 is larger than the lead 44 which will be formed to overlie the segment 66 and, consequently, provide improved electrical isolation between the lead 44 and the first MR layer 64. Next, an intermediate gap layer 68 is deposited, such as by a chemical vapor deposition process or sputtering, on top of the first magnetic layer 64 and then a second magnetic layer 72 is deposited thereon, such as by a sputtering technique, as shown in FIG. 6. The second magnetic layer 72 generally comprises the same material as the first magnetic layer 64.

Figure 7:
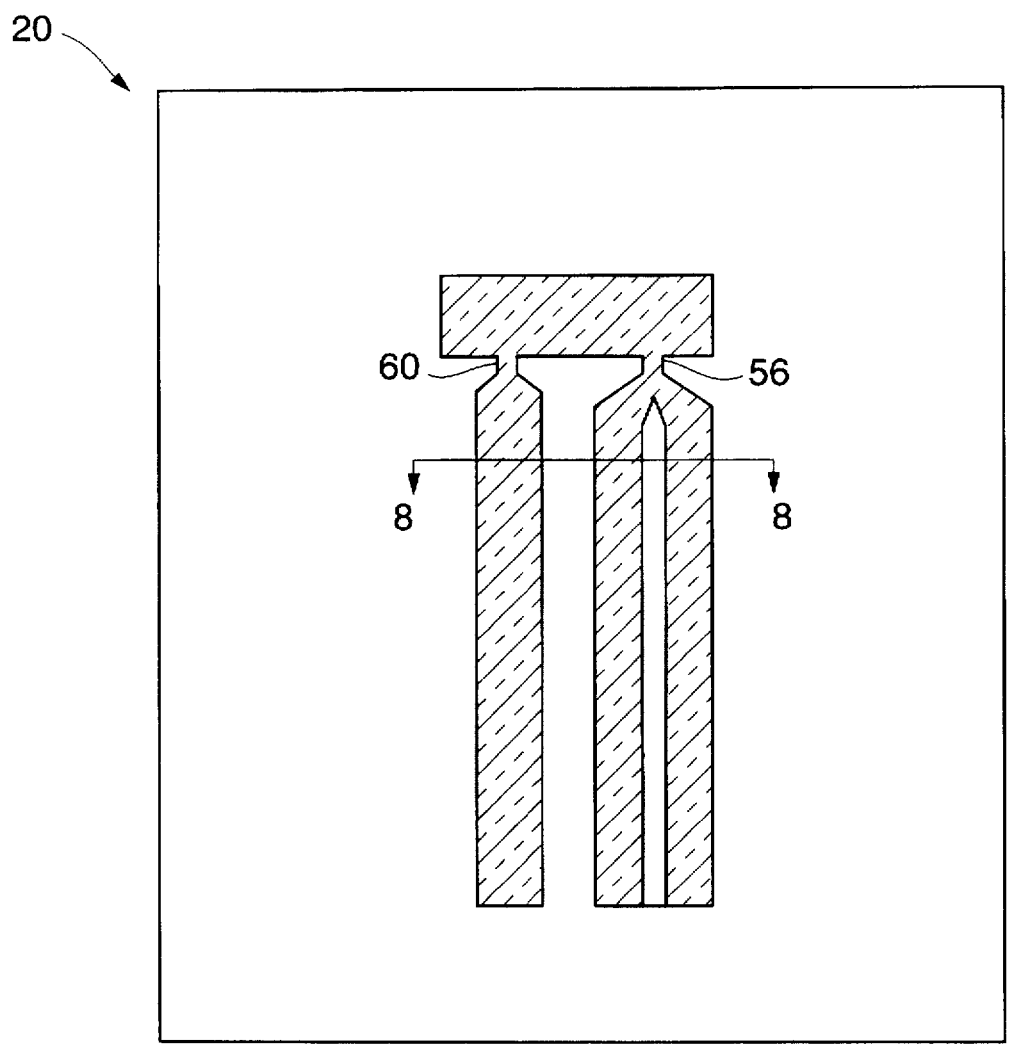
FIG. 7 is a top plan view of the simultaneously formed MR sensor regions and leads.
Figure 8:
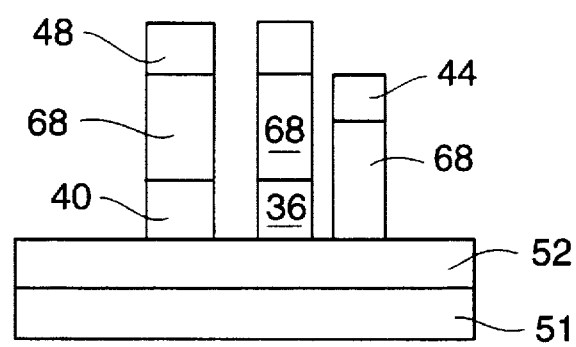
FIG. 8 is a sectional view of the leads taken along line 8—8 in FIG. 7.

Next, a photoresist mask is patterned on the wafer shown in FIG. 6 to define the pattern of the dual MR element head 20. Material from the magnetic layers 64 and 72 and the intermediate gap layer 68 is removed according to the defined pattern, such as by an ion milling technique, to simultaneously form the first and second MR elements 24 and 28 and the leads 36, 40, 44, and 48, as shown in FIGS. 7–8. In this manner, the leads 36 and 44 and the leads 40 and 48 extend from segments end 56 and 60, respectively, of the MR elements 24 and 28 that are substantially aligned and the length and width of the MR elements 24 and 28 are substantially the same (FIG. 1). Consequently, the active MR regions 54 (FIG. 1) of each of the MR elements 24 and 28 are substantially aligned.

Figure 9:
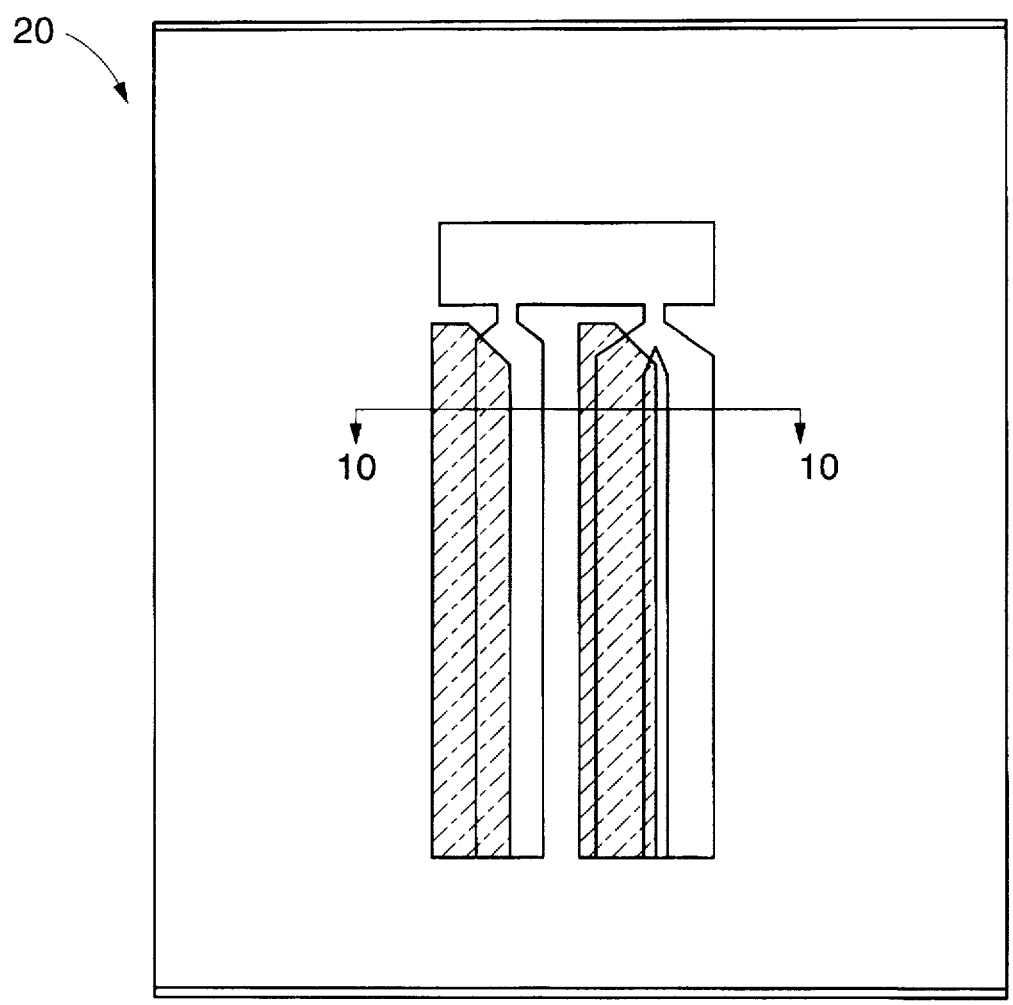
FIG. 9 is a top plan view during the course of exposing the first magnetic layer of the two leads.
Figure 10:
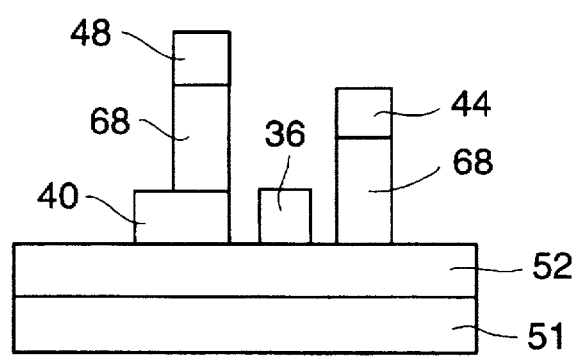
FIG. 10 is a sectional view of the leads taken along line 10—10 in FIG. 9.

The top of the leads 36 and 40 extending from the first MR element 24 are exposed so that conductive layers can be formed in electrical contact with the top of each of the leads 36, 40, 44, and 48. To expose the top of leads 36 and 40, a photoresist pattern is formed on top of the second magnetic layer 72, as shown in FIG. 9, and segments of the second magnetic layer 72 and intermediate gap layer 68 over the leads 36 and 40 are removed, such as by an ion milling and/or chemical etching technique, as shown in FIG. 10.

Figure 11:
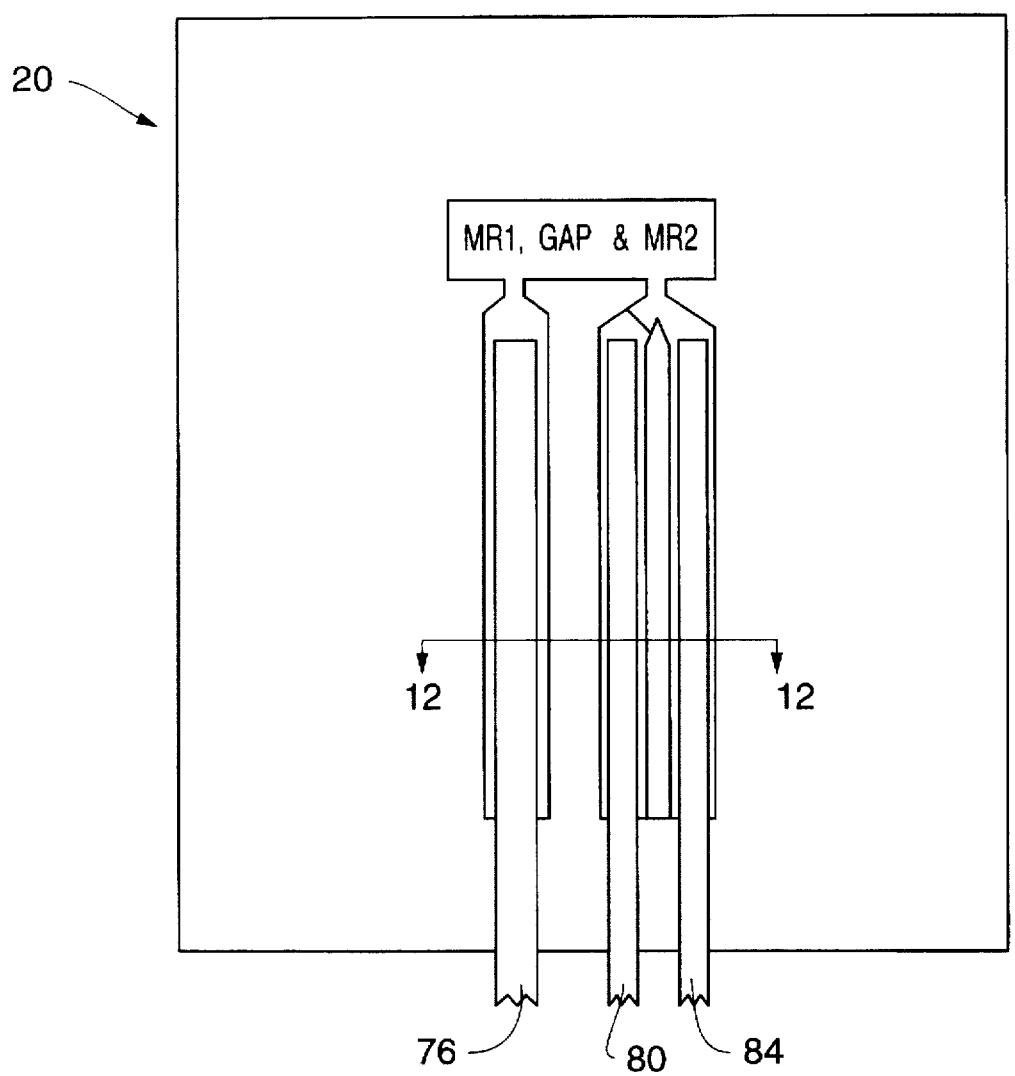
FIG. 11 is a top plan view of conductor portions formed on each lead.
Figure 12:
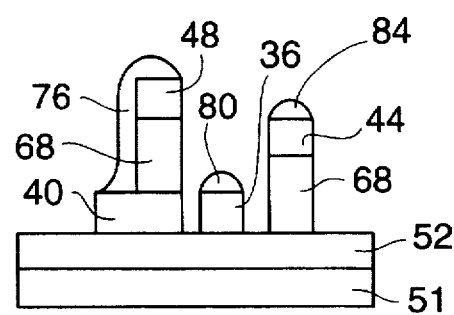
FIG. 12 is a sectional view of the leads and conductor portions taken along line 12—12 in FIG. 11.

Conductive layers are then formed across the top of each of the leads 26, 40, 44, and 48 using a technique such as by an evaporation or sputtering process to provide the structure shown in FIGS. 11–12. Advantageously, the formation of a coupled MR element head is simplified by the structure of lead 48 overlying lead 40 which allows a single conductive layer 76 to be formed across the top of and extending between the leads 40 and 48 to electrically couple the leads 40 and 48. Separate conductive layers 80 and 84 are formed across the top of leads 36 and 44, respectively. Advantageously, the sensitivity of the head 20 is improved by the conductive layers 76, 80 and 84 being formed to extend from close to the MR elements 24 and 28, thereby, minimizing the resistance of the leads. The conductive layers 76, 80 and 84 are formed such that the resistance of each MR element and their leads are substantially the same.

In this manner, conductive layers 80 and 84 can provide current from a read circuit to an end region of the first and second MR elements 24 and 28, respectively, while the conductive layer 76 can electrically couple the opposite end regions of the first and second MR elements 24 and 28 to a return current path. The coupled element MR head provides substantial improvements in performance by the read signal from the head 20 being provided as the differential output of the two MR elements 24 and 28.

Figure 14:
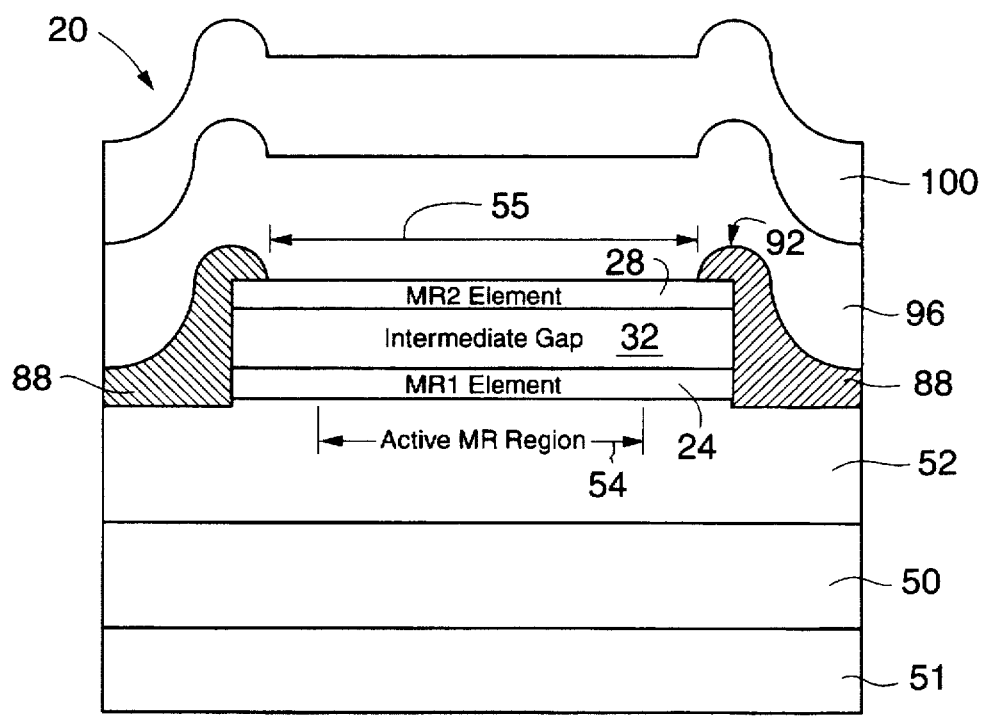
FIG. 14 is a sectional view taken along line 2—2 of FIG. 1 showing the dual MR elements formed between a bottom shield and a top shield.

Simultaneously forming the MR elements 24 and 28 generally creates a sharp step transition between the top edges of the second MR element 28 and the bottom gap layer 52 (FIG. 14). If a top gap layer were formed across the top of the second MR element 28 using prior art methods, the thickness of the top gap layer may be reduced along the top edges of the second MR element 28 which, in turn, can cause electrical shorting between the second MR element 28 and a top shield layer formed on top of the top gap layer. According to further embodiments of the present invention, inventive methods are provided for forming an additional gap layer having a predetermined thickness along the top edges of the second MR element 28 that can be substantially independent of the size of the step transition, thereby providing improved electrical isolation between the second MR element and a top shield layer.

Figure 13:
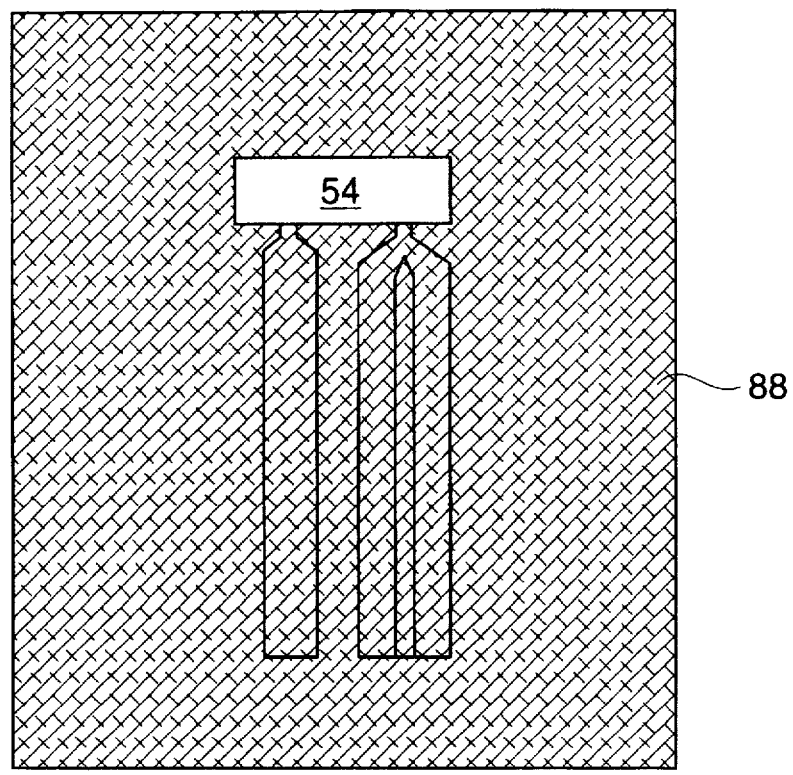
FIG. 13 is a top plan view of an additional gap layer selectively deposited over the dual MR element head.

FIGS. 13–14 illustrate one embodiment of the inventive method. According to this embodiment, a photoresist mask is patterned over region 55 to be slightly smaller than the MR elements 24 and 28. In this manner, any ripple in the topography of the top shield will have a reduced effect, if any, on the active MR region 54. An additional gap layer 88 is then deposited such as by a chemical vapor deposition or sputtering process. The additional gap layer 88 is then removed by a conventional lift-off technique to expose region 55.

Removing the additional gap layer 88 from the region 55 results in bumps 92 having a predetermined thickness along the edges of the second MR element 28, as shown in FIG. 14. Next, a top gap layer 96 is deposited using a technique such as chemical vapor deposition and a top shield 100 is deposited thereon, using a technique such as electroplating or sputtering. Importantly, the bumps 92 provide a predetermined insulation thickness between the top shield 100 and the edges of the second MR element 28, thereby improving the electrical isolation between the top shield 100 and the MR elements 24 and 28.

As further shown in FIG. 14, the top shield 100 can include bumps caused by the shield 100 being formed on top of the bumps 92. To avoid any effect that the bumps in the top shield 100 may have on the performance of the head 20, the MR elements 24 and 28 can include inactive segments between the active MR region 54 and their ends, and the bumps 92 in the additional gap layer 88 can be formed along the edge segments of the second MR element 28. In this manner, a planarized top shield layer 100 is provided over the active MR region of the elements 24 and 28, as shown in FIG. 14.

Figure 15:
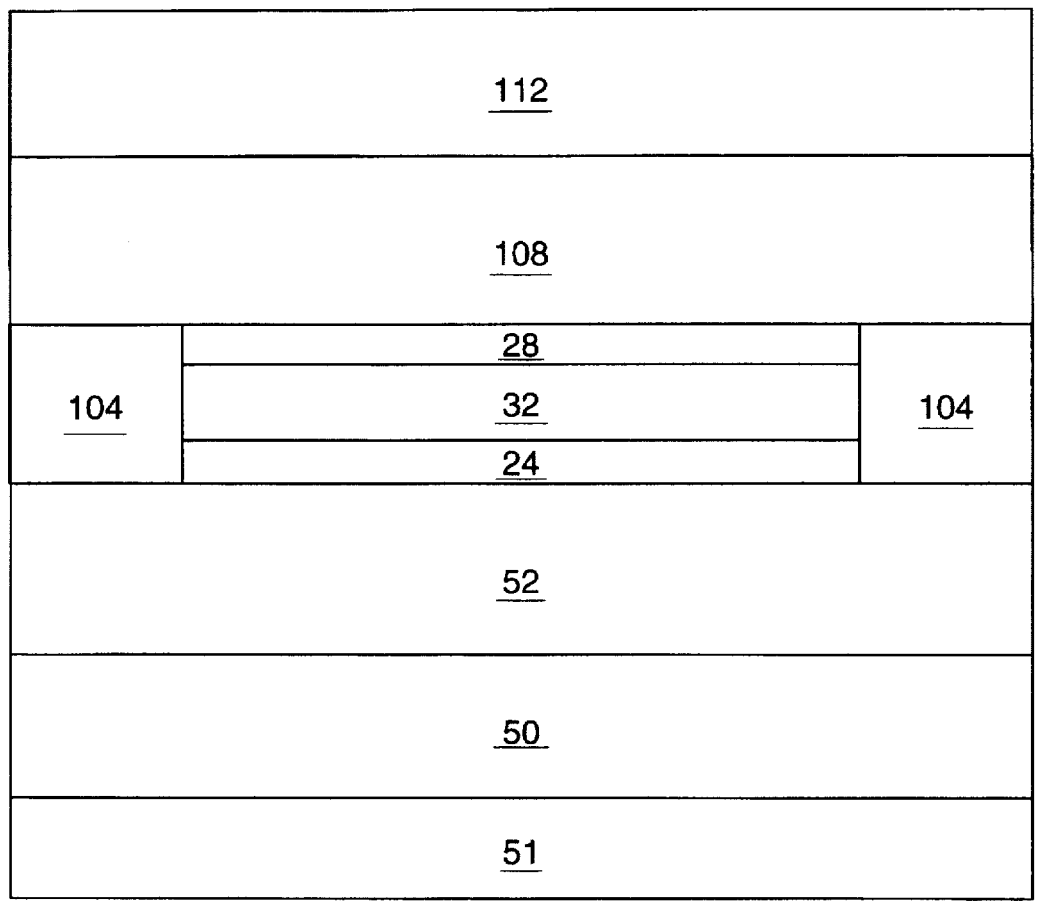
FIG. 15 is a sectional view taken along line 2—2 of FIG. 1 showing the dual MR elements formed between a bottom shield and a top shield according to another embodiment.

FIG. 15 illustrates another inventive method for forming an insulative layer between a top shield and the MR elements 24 and 28. According to this method, an additional gap layer 104 is formed across the top of the dual MR element head 20, such as by a chemical vapor deposition process. Importantly, a segment of the additional gap layer 104 is removed from the top of the second MR element 28 by lifting-off the same photoresist pattern that was previously deposited in relation to FIGS. 7–8 for patterning the MR elements and the leads. In this manner, the additional gap layer 104 is formed into a planarized layer adjacent to the edges of the second MR element 28, as shown in FIG. 15. A top gap layer 108 is deposited on top of the second MR element 28 and the planarized additional gap layer 104 followed by the deposition of a top shield layer 112. Advantageously, this method forms a substantially planar top shield layer 112, as shown in FIG. 15. Furthermore, since the additional gap layer 108 is removed from the top of the second MR element 28, the active MR region 54 can be defined to the edges of the MR elements 24 and 28.

The foregoing discussion has been presented for purposes of illustration and description. Further, the description is not intended to limit the invention to the form disclosed herein. Variation and modification commensurate with the above teachings, within the skill and knowledge of the relevant art, are within the scope of the present invention. The embodiments described herein above are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art.

What is claimed is:

1. A method of forming a magnetoresistive (MR) head having first and second MR elements, said first MR element including a first MR sensor with a first and a second lead for conducting current through said first MR sensor, said second MR element including a second MR sensor with a third and a fourth lead for conducting current through said second MR sensor, the method comprising the steps of:

providing a first magnetic layer and a second magnetic layer on a substrate, wherein at least portions of said first magnetic layer and said second magnetic layer are separated by an intermediate gap layer;

first forming said first MR sensor and said first and second leads from said first magnetic layer in said substrate while simultaneously forming said second MR sensor and said third and fourth leads from said second magnetic layer in said substrate.

2. The method of claim 1, said step of first forming substantially aligns said first and second MR sensors.

3. The method of claim 1, said step of first forming makes the length and width of said first and second MR sensors substantially the same.

4. The method of claim 1, said step of first forming substantially aligns said first and second MR sensors from which said first, second, third and fourth leads extend aligns the end segments of said sensors from which said second.

5. The method of claim 1, wherein:

said step of providing comprises the steps of:
depositing a bottom gap layer on a substrate;
depositing said first magnetic layer on at least portions of said bottom gap layer,
depositing said intermediate gap layer on at least portions of said first magnetic layer, and depositing said second magnetic layer on at least portions of said intermediate gap layer; and said step of first forming further comprises the step of:
selectively removing portions of said first and second magnetic layers and said intermediate gap layer to simultaneously form said first and second MR sensors and said first, second, third, and fourth leads.

6. The method of claim 5, said step of first forming further comprising the steps of:
depositing a first resist pattern on said first and second magnetic layers and said intermediate gap layer to define the pattern of said first and second MR sensors and said first, second, third, and fourth leads; and
ion milling around said first resist pattern to remove said first and second magnetic layers and said intermediate gap layer.

7. The method of claim 5, further comprising the step of:
removing said second magnetic layer and said intermediate gap layer along a segment of said first and second leads to expose top segments of said first magnetic layer and thereby provide electrical contacts for conducting current through said first MR sensor while segments of said second magnetic layer in said third and fourth leads provide electrical contacts for conducting current through said second MR sensor.

8. The method of claim 1, said step of first forming makes said fourth lead on top of said second lead.

9. The method of claim 8, further comprising the step of:
second forming a layer of an electrically conductive material extending across the top of and in electrical contact with said second magnetic layer of said fourth lead, across the top of and in electrical contact with said first magnetic layer of said second lead, and between said second and fourth leads to electrically couple said second and fourth leads.

10. The method of claim 1, wherein:
said step of providing further comprises the steps of:
depositing a bottom gap layer on a substrate;
depositing said first magnetic layer on said bottom gap layer,
selectively removing a segment of said first magnetic layer,
depositing said intermediate gap layer on said first magnetic layer, and
depositing said second magnetic layer on said intermediate gap layer; and said step of first forming further comprises the step of:
forming one of said third and fourth leads to overlie said selectively removed segment of said first magnetic layer to improve electrical isolation between said first magnetic layer and said one of said third and fourth leads.

11. The method of claim 10, wherein:
said step of selectively removing a segment of said first magnetic layer removes sufficient area of said first magnetic layer so that said one of said third and fourth leads does not overlie said first magnetic layer.

12. The method of claim 1, wherein:
said step of providing comprises the steps of:
depositing a bottom gap layer on a substrate;
depositing said first magnetic layer on at least portions of said bottom gap layer,
depositing said intermediate gap layer on at least portions of said first magnetic layer, and
depositing said second magnetic layer on at least portions of said intermediate gap layer; and said method further comprises the steps of:
second forming an additional gap layer along edges of said second magnetic layer to reduce a size of a step between a top of said second magnetic layer and a top of said bottom gap layer,
third forming a top gap layer on said first and second MR elements and said additional gap layer, and
fourth forming a sensor shield comprising a thick permeable magnetic material on said top gap layer and electrically isolated from said first and second MR elements by said additional gap layer and said top gap layer.

13. The method of claim 12, wherein:
said step of first forming comprises the step of:
making said leads to extend from ends of said first and second sensors that are a predetermined distance away from said ends of said sensors to provide an active sensor region on said sensors between said ends from which said leads extend and to provide an inactive sensor region on said sensors between said active sensor region and the ends of said sensors; and said step of second forming comprises the steps of:
depositing said additional gap layer on top of said first and second magnetic layers and said intermediate gap layer; and
removing said additional gap layer over said active sensor region of said sensors to avoid said second insulating gap layer from adversely affecting the performance of said active sensor region of said sensors.

14. The method of claim 12, wherein:
said step of first forming comprises the step of:
depositing a first resist pattern on said first and second magnetic layers and said intermediate gap layer to define the pattern of said first and second sensors and said first, second, third, and fourth leads; and said step of second forming comprises the steps of:
depositing said additional gap layer over said first and second magnetic layers and said intermediate gap layer; and
removing said first resist pattern to remove said additional gap layer over said active sensor region of said sensors.

* * * * *